(12) United States Patent
Kobayashi et al.

(10) Patent No.: US 7,373,460 B2
(45) Date of Patent: May 13, 2008

(54) MEDIA DRIVE AND COMMAND EXECUTION METHOD THEREOF

(75) Inventors: Hiromi Kobayashi, Kanagawa (JP); Hirofumi Saitoh, Kanagawa (JP); Takahiro Saito, Kanagawa (JP); Tadahisa Kawa, Kanagawa (JP); Atsushi Kanamaru, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 339 days.

(21) Appl. No.: 11/271,397

(22) Filed: Nov. 10, 2005

(65) Prior Publication Data

US 2006/0106980 A1 May 18, 2006

(30) Foreign Application Priority Data

Nov. 12, 2004 (JP) ............................. 2004-328625

(51) Int. Cl.
*G06F 12/00* (2006.01)
(52) U.S. Cl. ..................... 711/137; 711/168; 711/169
(58) Field of Classification Search ................ 711/125, 711/137, 150, 168, 169
See application file for complete search history.

(56) References Cited

U.S. PATENT DOCUMENTS

| | | | | |
|---|---|---|---|---|
| 6,189,072 B1* | 2/2001 | Levine et al. | ................ | 711/118 |
| 6,643,745 B1* | 11/2003 | Palanca et al. | ............. | 711/138 |
| 7,107,415 B2* | 9/2006 | Jeddeloh et al. | ............ | 711/154 |
| 2005/0289301 A1* | 12/2005 | Woo et al. | .................. | 711/137 |

FOREIGN PATENT DOCUMENTS

JP 2001-209500 8/2001

OTHER PUBLICATIONS

Kohout et al., "Multi-Chain Prefetching: Effective Exploitation of Inter-Chain Memory Parallelism for Pointer-Chasing Codes", © 2001 IEEE, p. 268-279.*
Jeon, et al., "Peer-topeer Multimedia Streaming and Caching Service", © 2002 IEEE, p. 57-60.*
Khan, et al., "Prefetch Scheduling for Composite Hypermedia", © 2001 IEEE, p. 768-773.*

* cited by examiner

*Primary Examiner*—Brian R. Peugh
(74) *Attorney, Agent, or Firm*—Townsend and Townsend and Crew LLP; Patrick Duncan

(57) ABSTRACT

Embodiments of the present invention provide a media drive capable of improving command processing performance by, when a plurality of commands is queued, shortening seek time and rotational latency, and also effectively making use of the shortened period of time. In one embodiment, a HDD includes a queue capable of storing a plurality of commands, and a queue manager for optimizing the execution order of the plurality of commands on the basis of whether or not the execution of each command requires access to a medium. The queue manager determines the execution order so that medium access processing of accessing a disk for execution, and data transfer processing of transferring data between the HDD and a host, are executed in parallel with each other. For example, read processing and transfer processing are executed in parallel with each other. The read processing is adaptive to read out a read command, data of which does not exist in the cache, from the disk into the cache. The transfer processing is adaptive to transfer a read command, data of which exists in the cache, to the host.

19 Claims, 10 Drawing Sheets

Command

Setup frame

Command completion notification

MEDIA DRIVE AND COMMAND EXECUTION METHOD THEREOF

CROSS-REFERENCES TO RELATED APPLICATIONS

This application claims priority from Japanese Patent Application No. JP2004-328625, filed Nov. 12, 2004, the entire disclosure of which is incorporated herein by reference.

BACKGROUND OF THE INVENTION

The present invention relates to a media drive that transfers write data or read data between the media drive and a host according to a command, and to a command processing method thereof. In particular, the present invention relates to a media drive that stores a plurality of commands in a queue to efficiently perform transfer between the media drive and a host, and to a command processing method thereof.

Devices using various types of media such as optical disks and magnetic tapes are known as information recording and reproducing devices. Among them, hard disk drives (hereinafter referred to as "HDD") have become popular as storage devices for computers to such an extent that they are one of the storage devices indispensable for today's computer systems. Further, not limited to computers, their application is widening more and more due to the superior characteristics with the advent of moving picture recording/reproducing devices, car navigation systems, removable memories for digital cameras and so on.

Almost all of HDDs, which are built into personal computers (PC) excluding servers and some workstations, adopt ATA (AT Attachment) or IDE (Integrated Drive Electronics) interface. In addition, as a result of the improvement in performance, and the increase in capacity, of the ATA interface, because costs of both a drive and a controller are low as compared with costs when SCSI (small computer system interface) is adopted, even entry servers adopt ATA as a hard disk interface in recent years. It is to be desired that a further improvement in performance be achieved without losing advantages of ATA, one of which is very low cost in contrast to the expensive SCSI interface.

As one method for achieving the improvement in performance, it is conceivable that the exchange of data between a HDD and a host is speeded up, that is, an interface is speeded up. There are two methods for speeding up the interface: one is that the number of signal lines is increased so as to increase the amount of data that can be transferred in one cycle; and the other is that a cycle of transferring data is shortened so that the larger amount of data can be transferred during unit time.

Between the two methods, the parallel ATA intended to achieve the speedup by shortening a transfer cycle. However, in order to achieve further speedup, it is necessary to extend the data width, or to increase a frequency of a strobe signal. However, if further speedup is tried, it becomes difficult to maintain synchronization of data between signal lines. Additionally, when a frequency of a signal increases, a problem arises in that the interference between signal lines and noises cannot be ignored. A device is adopted in which a ground line is located between the signal lines so as to make it possible to prevent the interference between the signal lines from occurring, which results in stable transfer. However, with the object of solving the problems, cables and connectors need to be changed to a large extent, and specifications of circuits for transmitting and receiving a signal also need to be changed. For example, a differential signal, the voltage of which is decreased, must be adopted. As a result, the low cost advantage of the ATA interface is lost.

For this reason, in order to achieve the speedup with the manufacturing cost being kept substantially the same as that of the ATA, a serial transmission method is proposed. Serial transmission has a feature that is advantageous to speedup. More specifically, as compared with parallel transmission, the number of signal lines dramatically decreases, and accordingly less interference occurs between signal lines as compared with the parallel transmission. The standards of this serial ATA are being defined by Serial ATA Working Group, constituted of, for example, main hard disk vendors, for the purpose of changing the physical interface of ATA from the conventional parallel interface (parallel ATA) to a high-speed serial interface.

Incidentally, when data is read/written from/to a HDD, the operation requiring the longest period of time is mechanical operation inside the HDD, including the moving time of a head, and rotational latency of a disk. What is required is, therefore, not only an improvement in transfer rate, but also a reduction in the period of time required for read and write.

While electric processing, such as transmitting/receiving a command, decoding, and accessing a memory, is completed in microsecond ($\mu$s) order, the mechanical operation inside the HDD requires a long period of time of millisecond (ms) order. The mechanical operation inside the HDD is constituted of the head moving time and the rotational latency. The head moving time denotes a period of time (the seek time) taken from the issuance of a read/write instruction by the HDD until a head is positioned at a target track on a disk. Because this seek time is largely influenced by the moving distance between tracks, the average seek time obtained by dividing the seek time moving from the innermost track to the outermost track by 2 is usually used as a performance indicator.

The rotational latency denotes the waiting time from when the head is moved to a track until the head arrives at a target sector in the track as a result of the rotation of the disk. It is to be noted that although the amount of rotation of the disk differs to a large extent depending on a position of the last sector, a maximum value of the rotational latency is uniquely determined by the rotational speed of the disk. For example, when the rotational speed is 5400 rpm, the maximum value is 11.1 ms; when the rotational speed is 7200 rpm, the maximum value is 8.3 ms; when the rotational speed is 10000 rpm, the maximum value is 6 ms; and when the rotational speed is 15000 rpm, the maximum value is 4 ms.

"Command Queuing" is provided to avoid overhead caused by such mechanical operation to the utmost. The Command Queuing successively issues a plurality of commands without waiting for the completion of command execution, and stores the commands in a queue just as they are. This makes it possible to successively transmit the commands to the HDD without waiting for, on a command basis, the completion of the mechanical operation of the HDD, which requires a long period of time.

In the Command Queuing, instead of executing the commands, which are stored in the queue, according to the order in which the commands have been received (in order), the plurality of commands stored in the queue are rearranged in the efficient order before the commands are executed. The commands are executed by, what is called, out of order. The efficient order is the order that can shorten the distance between tracks so that the move of the head can be shortened as much as possible, and that can shorten the distance between sectors so that the rotational latency becomes short. To be more specific, it is the order that can shorten the mechanical operation of the HDD by shortening the sum of the seek time and the rotational latency. This technique is, what is called, Rotational Positioning Ordering (hereinafter referred to as "RPO").

In recent years, the seek time is shortened as much as possible not only by paying attention to the positional relationship between tracks, but also paying attention to the positional relationship between sectors and the closest head position. It is because the rotational latency may increase depending on the positional relationship between sectors in some cases. Accordingly, with the object of avoiding such an increase in rotational latency, what is being adopted is a method in which commands are rearranged so that the sum of the seek time and the rotational latency can be shortened as a whole to realize the command execution order in efficient combination with other commands.

In addition, with the object of quickly executing write and read commands to process data, for example, if the top and the end of logical block addresses (Logical Block Address: LBA) of read data read out from a hard disk by a read command agree with or overlap the corresponding ones of another read command, these read commands are integrated so that the commands are executed at a time. This is how to efficiently handle the commands (see, e.g., patent document 1 (Japanese Patent Laid-Open No. 2001-209500)).

Incidentally, also in the "Serial ATA II: Extensions to Serial ATA 1.0a" (hereinafter referred to as "Serial ATAII"), which is already released, a command queuing technology called NCQ (Native Command Queuing) is adopted. The NCQ permits a HDD itself to internally determine the execution order of commands that are queued. This makes it possible to effectively reduce the sum of the seek time and the rotational latency, which are caused by the mechanical internal operation of the HDD.

The NCQ is a function designed taking over the way of thinking of the "Tagged Command Queuing" which the SCSI has. The NCQ has the following three functions:

1. Race-free Status Return Mechanism
2. Interrupt Aggregation
3. First Party DMA (FPDMA).

The "Race-free Status Return Mechanism" is a mechanism by which even when any kind of command is being executed, or at any timing, a status can be freely returned from a drive (usually, a HDD) to, for example, a host controller such as a PC. Additionally, for a response to the status, a handshake with the host does not occur at all. Accordingly, the drive can successively transmit, to the host controller, execution completion statuses of a plurality of commands.

The "Interrupt Aggregation" is a function of suppressing the occurrence of an interruption by integrating, into one, interruptions occurring in a plurality of commands. Next, the "First Party DMA" is a function that allows the drive to set up the DMA (Direct Memory Access) operation for data transfer without the intervention of driver software on the host controller side. The Serial ATA is provided with FIS called DMA Setup FIS, by which the drive selects DMA context on the host controller side. The FIS (Frame Information Structure) is a structure of a frame that is a basic transfer unit of the Serial ATA.

The DMA Setup FIS stores information including tag numbers (0-31) corresponding to commands for which the DMA setup is performed, and the amount of data (DMA Transfer Count) transferred to the host controller. The host controller carries out the DMA transfer processing on the basis of the DMA Setup FIS received from the drive.

BRIEF SUMMARY OF THE INVENTION

Since the SCSI is high cost as described above, it is to be desired that using an inexpensive interface such as ATA, the performance of a hard disk, such as communication speed, be improved while the cost is kept low.

Moreover, as far as the Serial ATA is concerned, the "Command Queuing" function itself has existed (ATA/ATAPI-4 Command Queuing) before the Serial ATA II comes out. However, this "Command Queuing" function was not realistic because only few HDD vendors support this function, and because the above-mentioned functions of Race-free Status Return Mechanism, Interrupt Aggregation, and First Party DM are not included. Here, because the "Command Queuing" function of the Serial ATA does not have these functions, even if queuing is done, the overhead of the queuing is too large, and therefore an improvement in performance achieved by the queuing is offset.

In the Command Queuing protocol (ATA/ATAPI-4 Command Queuing) defined in the conventional Serial ATA I, it was possible to rearrange commands including a read command. However, when starting data transfer, a HDD first notifies a host of a ready state, and next the HDD waits for an acknowledgment command returned from the host, and then actual data transfer is started.

To be more specific, the "Command Queuing" in the conventional Serial ATA does not have the "Race-free Status Return Mechanism" described above. The drive cannot therefore return a status of another command unless driver software on the host controller side issues a "Service" command so that a status of the next command can be accepted. Accordingly, access delay and the overhead of a CPU occur in a command completion phase.

In addition, in the ATA interface, when executing a command, processing is basically performed according to the following order: issuance of a command (Command); waiting (Wait); transfer of information or data (Transfer); and interruption (Interrupt). In the case of the "Command Queuing" used in the conventional Serial ATA, therefore, an interruption occurs on a command basis. Accordingly, if a large number of commands are stored in a queue, interruptions by these commands cause the heavy overhead.

Moreover, since the "Command Queuing" in the conventional Serial ATA does not support First Party DMA, an interruption to the host controller occurs at the time of performing data transfer. The driver software on the host controller side needs to execute some steps with this interruption acting as a trigger. To be more specific, since the driver software on the host controller side intervenes the setup of DMA transfer many times, the heavy overhead occurs.

Thus, in the case of the HDD that uses the "Command Queuing" in the conventional serial ATA, it is not possible to determine the timing of starting data transfer. This poses problems with the heavy overhead caused by interruptions. For this reason, if these problems can be solved by the NCQ specified in the Serial ATAII, it is possible to provide a HDD capable of effectively reducing the seek time and the rotational latency which are caused by the mechanical internal operation of the HDD.

The present invention has been made in view of such circumstances. It is therefore a feature of the present invention is to provide a media drive capable of shortening seek time and rotational latency when a plurality of commands are queued, and improving the performance of command processing by effectively making use of the shortened period of time, and to provide the command processing method thereof.

According to one aspect of the present invention, there is provided a media drive that transfers write data or read data between the media drive and a host according to a command. The media drive includes a queue capable of storing a plurality of commands; and a command manager for classifying the plurality of commands on the basis of whether or not the execution of each command requires access to a medium, and then for optimizing the execution order of the commands; wherein the command manager optimizes execution order so that medium access processing of accessing the medium for execution, and data transfer processing of transferring data between the media drive and the host, are executed in parallel.

In the present invention, on the basis of whether or not it is necessary to access a medium, the order of commands is optimized so that medium access processing and data transfer processing are executed in parallel. For example, two commands are executed in parallel. As a result, it is possible to improve the processing efficiency of a plurality of commands.

In addition, the command manager classifies processing of the command into medium access processing that performs the medium access processing, and data transfer processing that performs the data transfer processing. On the basis of the result of the classification, it is possible to optimize the execution order. Not only by classifying the processing on the basis of a kind of command, but also by further classifying even processing of one command into medium access processing and data transfer processing, it is possible to achieve the high efficiency of command execution.

In addition, the media drive further includes a temporary storage unit for storing write data transferred from the host, and read data to be transferred to the host. The command manager classifies read commands into an access unnecessary read command, all of read data of which is stored in the temporary storage unit, and an access necessary read command, part or all of the read data of which is stored only in the medium, and thereby can optimize the execution order on the basis of the result of the classification. Thus, the read commands can be classified on the basis of whether or not it is necessary to access the medium.

Moreover, the media drive further comprises a temporary storage unit for storing write data transferred from the host, and read data to be transferred to the host. Among several pieces of processing of the read command, the command manager can classify processing of reading out, into the temporary storage unit, part or all of read data stored only in the medium as the medium access processing, and can classify processing of transferring read data stored in the temporary storage unit to the host as the data transfer processing. The command manager can also classify processing of a write command, which stores write data from the host in the temporary storage unit, as the data transfer processing. To be more specific, the several pieces of processing of the read command is classified into the medium access processing between the medium and the temporary storage unit, and the data transfer processing that occupies a transmission line (bus) between the temporary storage unit and the host, so that both can be executed in parallel with each other.

Further, if part of the read data is stored only in the medium and the rest is stored in the temporary storage unit, the command manager can execute in parallel the medium access processing of reading out the part of the read data stored only in the medium into the temporary storage unit, and the data transfer processing of transferring to the host the rest of the read data in question stored in the temporary storage unit. This makes it possible to shorten the processing time of one command.

Still further, the command manager can execute in parallel the medium access processing of reading out the read data, part or all of which is stored only in the medium, into the temporary storage unit, and the data transfer processing of other read commands or that of a write command. This makes it possible to concurrently execute processing of two commands in parallel.

In addition, if part of the read data is stored only in the medium and the rest is stored in the temporary storage unit, the command manager can execute in parallel the medium access processing of reading out the part of the read data stored only in the medium into the temporary storage unit, and the data transfer processing of transferring to the host the rest of the read data stored in the temporary storage unit, or processing of the access unnecessary read command or processing of a write command. This makes it possible to shorten the processing time of the commands.

Moreover, the command manager further includes a read-ahead range determination part for determining a range of read-ahead data of a read command on the basis of the result of the classification. The read-ahead range determination part can determine the read-ahead range so that data of one of the access necessary read commands, which is stored only in the medium, is included in the read-ahead data of another of the access necessary read commands. Accordingly, read-ahead processing of one access necessary command can cause other access necessary commands to become access unnecessary commands.

Further, the read-ahead range determination part compares addresses of read data to be read out from the medium for each of the access necessary read commands, and if the relationship between one end of one address and one end of another address satisfies specified conditions, the read-ahead range determination part can set the read-ahead range of the one address so that the another address is included. Accordingly, only when the specified conditions are satisfied, the read-ahead range can be determined.

In addition, the read-ahead range determination part compares the sum total of a length of time required to individually read out each read data of the plurality of access necessary read commands, which is stored only in the medium, with the sum total of a length of time required to read out the same read data in succession, and then determines a read-ahead range on the basis of the result of the comparison. Accordingly, in response to the processing time, it is possible to determine how to handle the read commands, either handling the read commands individually, or handling the read commands by means of read ahead.

Moreover, the command manager can reclassify an access necessary read command, read data of which is included in the read-ahead range determined by the read-ahead range determination part, as an access unnecessary read command. This makes it possible to optimize the order of command processing, resulting in an improvement in processing efficiency.

Furthermore, the command manager can determine the execution order on the basis of the execution priority of the commands, or the execution priority of processing of the commands. For example, the command manager can place a higher execution priority on the read command than on the write command. The command manager can also place a higher execution priority on a command that has been stored in the queue earlier. The command manager can also place a higher execution priority on the access unnecessary read command than on the access necessary read command, or can also place a higher execution priority on the data transfer processing than on the medium access processing.

According to another aspect of the present invention, there is provided a media drive that transfers write data or read data between the media drive and a host according to a command. The media drive includes: a queue capable of storing a plurality of commands; and a command manager for classifying the plurality of commands on the basis of whether or not the execution of each command requires access to a medium, and then for optimizing the execution order of the commands; and a read-ahead range determination part for determining a read-ahead range of a read command on the basis of the result of the classification, wherein the read-ahead range determination part determines a read-ahead range of a read command requiring access to a medium so that the read-ahead range causes other read commands requiring access to the medium not to require access to the medium.

In the present invention, when a read command is executed, a read-ahead range is determined so as to eliminate the need for access to a medium as much as possible. Then, by increasing the number of commands that do not require access to the medium, and that can be completed in a short period of time, and by optimizing the execution order of the commands, it is possible to improve the performance of command processing.

According to still another aspect of the present invention, there is provided a command processing method for a media drive capable of storing a plurality of commands in a queue to execute the commands. The command processing method includes the steps of: classifying the plurality of commands on the basis of whether or not the execution of each command requires access to a medium; and on the basis of the result of the classification, optimizing execution order of the plurality of commands so that medium access processing of accessing the medium for execution, and data transfer processing of transferring data between the media drive and a host, are executed in parallel with each other.

According to still another aspect of the present invention, there is provided a command processing method of a media drive capable of storing a plurality of commands in a queue to execute the commands. The command processing method includes the steps of: determining a read-ahead range of a read command requiring access to a medium, among the plurality of commands, so that the read-ahead range causes other read commands requiring access to the medium not to require access to the medium; and optimizing the execution order of the plurality of commands on the basis of whether or not the execution of each command requires access to the medium.

According to the present invention, command processing performance can be improved by, when a plurality of commands are queued, shortening seek time and rotational latency, and optimizing the command execution order so as to effectively make use of the shortened length of time.

BRIEF DESCRIPTION OF THE DRAWINGS

FIG. 12 is a diagram illustrating an effect of improving processing of read commands by means of read ahead in a HDD according to an embodiment of the present invention.

DETAILED DESCRIPTION OF THE INVENTION

Specific embodiments to which the present invention is applied will be described in detail with reference to drawings. As described above, as for the serial ATA II, the Native Command Queuing (NCQ) protocol is newly defined. In the NCQ protocol, it is possible to determine the start timing of data transfer on the HDD side; and it is also possible to concurrently perform data transfer required by a plurality of commands. The embodiments to which the present invention is applied relates to a HDD and a command processing method thereof. This HDD can executes command queuing with high efficiency by making maximum use of the function of determining the start timing of data transfer on the HDD side, and the function of concurrently performing data transfer required by a plurality of commands.

In a HDD having a function of queuing a plurality of commands according to this embodiment, commands, and processes thereof, which are held in a queue, are classified according to whether or not an access to a magnetic disk is required, more specifically, on the basis of an occupation ratio of a bus where a command is being executed. Then, on the basis of the result of the classification, the plurality of commands, or processes of the commands, are executed in parallel, which makes it possible to improve the efficiency of command execution.

To be more specific, if there is no data in the cache at the time of executing a read command, it is necessary to access the magnetic disk so that data is first read out into the cache.

During this processing, a transmission line (bus) between the HDD and a host is in an unoccupied state. During the above processing time, therefore, processing that can be executed, more specifically, data transfer between the HDD and the host, is executed. As a result, medium access processing of a read command that requires access to the magnetic disk, and data transfer processing of a command that does not require access to the magnetic disk, are executed in parallel.

Incidentally, although this embodiment describes an example that uses the Native Command Queuing (NCQ) protocol of the serial ATA II, the present invention is not limited to the serial transmission, or the serial ATA II protocol. It is needless to say that the present invention can also be applied to command processing in a media drive that has a function of queuing of a plurality of commands, and a function of determining the start timing of data transfer on the drive side, and concurrently performing data transfer required by a plurality of commands.

Figure 1:
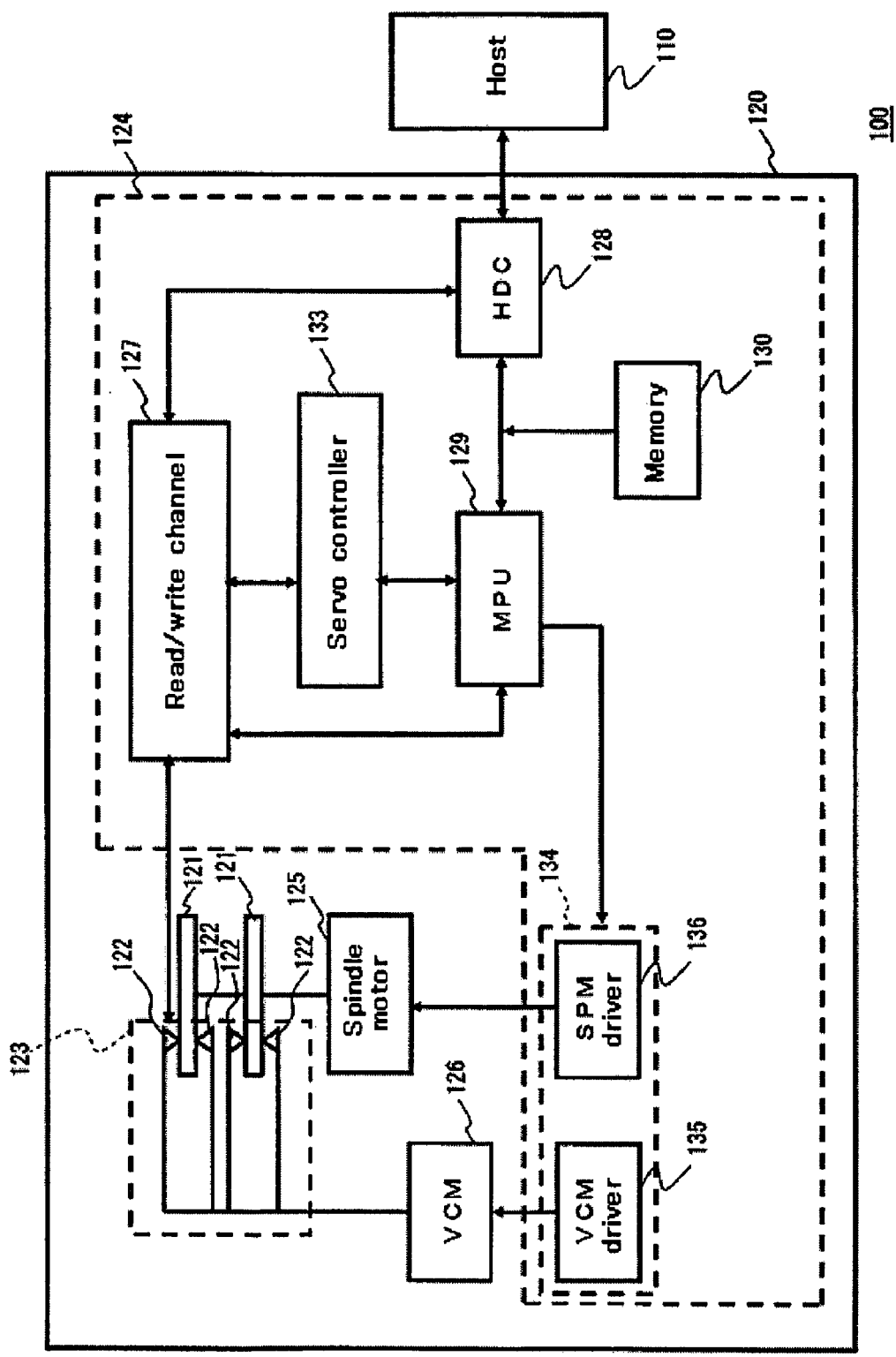
FIG. 1 is a block diagram schematically illustrating a configuration of a data processing system according to an embodiment of the present invention.

To begin with, a data processing system including a HDD and a host according to this embodiment will be described. FIG. 1 is a block diagram schematically illustrating a configuration of a data processing system 100 according to this embodiment. The data processing system 100 includes: higher level equipment (host) 110 for performing data processing, such as a computer and a digital camera; and a HDD 120 that is a storage device for storing data transmitted from the host 110. The HDD 120 comprises: a head stack assembly 123 including, in a frame, one or more magnetic disks 121, which are used as an example of a medium, and one or more magnetic heads 122, each of which is associated with a recording surface of each magnetic disk; and a controller 124 for controlling these elements so that data is read/written from/to the magnetic disks 121.

Host user data transmitted from the host 110 is subjected to necessary processing and converted into a write signal by the controller 124 before the write signal is sent to the head stack assembly 123. According to the acquired write signal, the magnetic head 122 writes data to a recording surface of the magnetic disk 121. On the other hand, a read signal read from the magnetic disk by the magnetic head 122 is converted into a digital signal and subjected to necessary processing by the controller 124 before the signal is transmitted to the host 110.

The magnetic disk 121 is a nonvolatile recording medium having magnetic layers which are magnetized to record data. When the HDD 120 is operating, the magnetic disk 121 is driven to rotate at a prescribed constant speed around a spindle of the spindle motor 125. When the HDD 120 is not operating, the magnetic disk 121 remains stationary. On the surface of the magnetic disk 121, a plurality of tracks are concentrically formed as blocks for storing data. Further, each track is divided into a plurality of sectors in the circumferential direction.

Servo data storage areas are formed on the surface of the magnetic disk 121. Typically, the magnetic disk 121 has a plurality of servo data storage areas formed along the radial direction. In addition, a servo data storage area and a user data storage area are formed in each sector. Servo data is read out by the magnetic heads 122, making it possible to acquire information about a position of the magnetic heads 122. The servo data includes: track data having track number information; sector data having sector number information; and a burst pattern.

The head stack assembly 123 is mounted in the frame so as to be able to pivotally move along the surface of the magnetic disk 121. The head stack assembly 123 is driven by a voice coil motor (VCM) 126. The head stack assembly 123 is provided at its tip with the magnetic heads 122 each comprising a slider and a magnetic thin film element. As the head stack assembly 123 pivotally moves, the magnetic heads 122 move in the radial direction of the magnetic disks 121 over the surfaces thereof. This allows the magnetic heads 122 to access a desired track.

The head stack assembly 123 has two magnetic heads 122 for each magnetic disk 121 and the two magnetic heads are respectively associated with the top and bottom surfaces of the magnetic disk 121. If data is not written or read, the magnetic head 122 is typically unloaded onto a ramp mechanism (not illustrated) disposed outside the magnetic disk 121. However, if a CSS (Contact Start and Stop) method is used, the magnetic head 122 is unloaded into a CSS zone located on the inner circumference. The magnetic head 122 writes data to the magnetic disk 121, or reads servo data and user data from the magnetic disk 121.

As shown in FIG. 1, the controller 124 includes a read/write channel (R/W channel) 127, a hard disk controller (HDC) 128, a microprocessor unit (MPU) 129, a memory 130, a servo controller 133, and a motor driver unit 134. The motor driver unit 134 includes a voice coil motor driver (VCM driver) 135 and a spindle motor driver (SPM driver) 136.

The R/W channel 127 performs write processing on data obtained from the host 110. In the write processing, the R/W channel 127 performs code modulation on write data supplied from the HDC 128, and then converts the code-modulated write data into a write signal (electric current), supplying the write signal to the magnetic head 122. The magnetic head 122 writes the data to the magnetic disk 121 by letting current flow through the coils according to the obtained signal. In the meantime, when data is supplied to the host 110, read processing is performed. In the read processing, the read/write channel 127 picks up data from a read signal supplied from the magnetic head 122, and performs decoding processing on the picked-up data. The decoded read data is supplied to the HDC 128.

Operating according to microcodes loaded to the memory 130, the MPU 129 executes not only the general control of the HDD 120, including positioning control of the magnetic head 122, interface control, and defect management, but also data processing-related necessary processing. When the hard disk drive 120 is started, the microcodes to operate on the MPU 129 and the data to be required for control and data processing are loaded to the memory 130 from the magnetic disk 121 or a ROM (not shown).

Digital data read out by the R/W channel 127 includes not only user data from the host 110 but also servo data. The servo controller 133 extracts servo data from read data obtained from the R/W channel 127. The servo data includes track data, sector data, and a burst pattern. The extracted servo data is transferred from the servo controller 133 to the MPU 129.

According to the microcodes, the MPU 129 performs the positioning control processing of the magnetic head 122 by use of the servo data. Control data from the MPU 129 is output to the VCM driver 134. The VCM driver 134 supplies driving current to the VCM 126 according to the control signal. In addition, the MPU 129 stores SPM control data in a register in the motor driver unit 134 according to the microcodes in order to control the rotation of the spindle motor 125. The SPM driver 136 executes the rotational control of the spindle motor 125 according to the SPM control data stored.

The HDC 128 has a function of interfacing with the host 110. The HDC 128 receives user data, control data including read and write commands, and the like, transferred from the host 110. The user data received is transferred to the R/W channel 127. In addition, the HDC 128 transfers to the host 110 read data from the magnetic disk, acquired from the R/W channel 127, or control data used for data transfer. Moreover, the HDC 128 executes error correction processing on the user data, and the like.

The data transfer of control data and user data between the HDC 128 and the host 110 is controlled by micro codes operating on the hard disk controller 128 and the MPU 129. In particular, the HDD 120 in this embodiment has a command queuing function of queuing specified commands from the host 110. The command execution order in the HDC 128, or the transfer order of control data and user data between the host and the device, is controlled and managed from the viewpoint of an improvement in performance of the HDD 120.

A description will be next made of command queuing, and a command processing method for executing a command between a host and a device, more specifically, between the host 110 and the HDD 120. In an interface between the host and the device according to this embodiment, the HDD 120 can internally control the execution order of specified processing, which makes it possible to achieve an improvement in performance of the HDD 120. In particular, in data communications between the host and the device according to this embodiment, the timing of transferring data to the host 110 can be determined on the side of the HDD 120, and data transfer processing required by a plurality of commands can be concurrently performed. Accordingly, it is possible to improve the execution performance of a plurality of commands stored in a queue.

Figure 2:
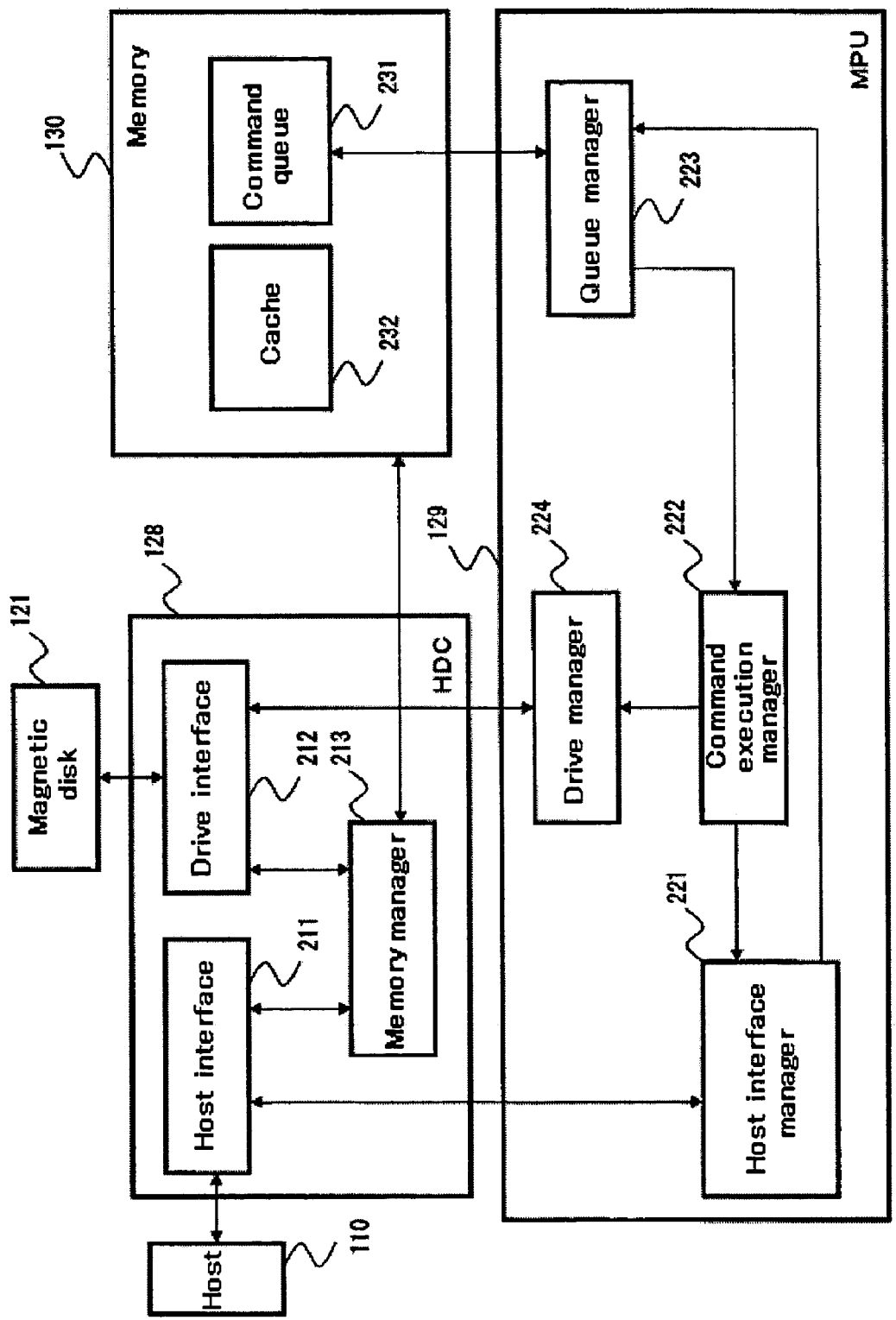
FIG. 2 is a block diagram illustrating a substantial part that executes data transfer processing between a host and a device in an interface between the host and the device according to an embodiment of the present invention.

FIG. 2 is a block diagram illustrating a substantial part that executes data transfer processing between the host and the device in the interface between the host and the device according to this embodiment. The HDC 128 includes a host interface 211, a drive interface 212, and a memory manager 213. Microcodes operating on the MPU 129 instruct the MPU 129 to function as a host interface manager 221, a command execution manager 222, a queue manager 223, and a drive manager 224. The memory 130 temporarily stores commands and data, and can function as a command queue 231 and a cache 232 that is a temporary storage unit. What are stored in the cache 232 includes not only transfer data (read data or write data), which is temporarily stored, but also information such as a LBA, and the length, of the transfer data.

The host interface 211 performs actual data transfer between the host 110 and the host interface 211. The drive interface 212 performs actual data input-output processing between the drive interface 212 and the magnetic disk 121 (or the read/write channel 127) that is an example of a medium. The memory manager 213 controls how to store data in the memory 130. The memory manager 213 also performs intermediate processing of a command and user data between the memory 130 and other function blocks in the hard disk controller 128.

The host interface manager 221 manages the host interface 211, and transmits/receives a specified notification or command to/from the host interface 211. In addition, the host interface manager 221 functions as an interface between the hard disk controller 128 and other logical blocks that function in the MPU 129. Further, on the basis of data such as a notification and a request, which are acquired from other function blocks, the host interface manager 221 controls, for example, the timing of issuing a command completion notification that is exchanged between the host interface 211 and the host 110.

The queue manager 223 functions as a command manager that classifies commands queued in the command queue 231, and that on the basis of the result of the classification, executes rescheduling to determine the appropriate command execution order from the viewpoint of the performance optimization. The command execution manager 222 controls the execution of commands on the basis of the result of the classification by the queue manager 223, and the command execution order determined by the queue manager 223. By controlling the drive interface 212, the drive manager 224 controls writing/reading data to/from the magnetic disk 121. The drive manager 224 controls the drive interface 212 in response to a request from the command execution manager 222.

Next, basic operation of the command queuing according to this embodiment will be described. It is to be noted that commands that are transmitted from the host 110 can include not only commands to be queued but also commands not to be queued. For example, in the SATA II, not only NCQ, but also protocols such as DMA (Direct Memory Access) and PIO (Programmed I/O) can be supported at the same time. Commands to be queued can be determined by referring to, for example, an identifier given to a command. Here, commands to be queued, and data transmission required to queue the commands, will be described. In addition, commands to be queued will be described by way of example a read command and a write command.

Figure 3:
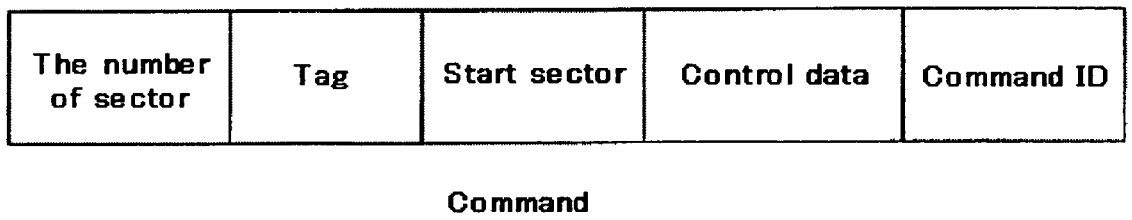
FIG. 3 is a diagram illustrating as an example a data format of a command according to an embodiment of the present invention.

FIG. 3 is a diagram illustrating as an example a data format of a command according to this embodiment. The data format of the figure can be applied to a read command or a write command. In this embodiment, a command to be queued is a read command or a write command with a tag including a "Tag" field. Each command to be queued is identified by a tag corresponding to the command. The number of unfinished commands that can be identified by the tags is determined in response to the depth of a queue. As for the NCQ, 32 commands are respectively identified by tags that denote 0 through 31.

In FIG. 3, "Start sector" denotes a start sector of data that is requested to be transferred. "The number of sectors" denotes the number of sectors from the start sector. A sector can be identified, for example, by a LBA. The command further includes "Command ID" used to distinguish between a read command and a write command. In addition, the command can include other control data, for example, data used for cache control. In the NCQ, they are "Read FPDMA (First Party DMA) Queued", "Write FPDMA Queued", and the like.

A command transmitted from the host 110 is received by the host interface 211. The command is then stored in the command queue 231 through the memory manager 213. The host interface 211 notifies the host interface manager 221 that the command has been inputted. On receipt of the notification from the host interface 211, the host interface manager 221 requests the host interface 211 to clear a busy state. After receipt of a command, in a stage in which a new command can be accepted, the busy state is cleared before transferring user data. Moreover, the host interface manager 221 requests the queue manager 223 to classify commands and to reschedule the command execution order. A plurality of unfinished commands can be queued in the command queue 231.

Using a command ID of a command stored in the command queue 231, the queue manager 223 distinguishes between a read command and a write command. In addition, in the case of the read command, the queue manager 223 checks whether or not the cache 232 includes a LBA of the data. Here, if read data of this read command exists in the cache 232, data transfer processing is performed so that the read data read out from the cache 232 is transferred to the host. On the other hand, in the case of the write command, data transfer processing is performed so that write data transferred from the host is received and is then written to the cache 232. In contrast to this, if data of the read command does not exist in the cache 232, then it is necessary to process an access to a magnetic disk to read out data (hereinafter referred to as "medium access processing"). In this case, processing of the read command is made up of this medium access processing and the above-mentioned data transfer processing. The queue manager 223 classifies these commands and the processing thereof on the basis of whether or not an access to a medium is required, and which processing to be performed is medium access processing or data transfer processing. After that, on the basis of the result of the classification, from the viewpoint of the performance, the execution order of unfinished commands in the command queue 231 is determined so that the commands are executed in the optimum order. This is how to reschedule the execution order of the commands. In particular, the command execution order is determined so that the sum of the seek time and the rotational latency can be minimized. Here, in this specification, the total of the sum of the seek time and the rotational latency (hereinafter also referred to as "latency") and the sum of the data read time is called the medium access processing time.

At the time of rescheduling, the queue manager 223 determines the execution order according to given algorithm in consideration of various kinds of parameters. Many parameters to be referred to include, for example, the seek length, an access starting position, an actuator operation profile, positioning in a rotation direction, and a cache state. Here, in this embodiment, in the case of the read command, the length of read ahead is determined by a LBA of read data as described below. As a result, the execution order is determined also in consideration of the length of read ahead. Moreover, the order of commands stored in the command queue 231 can be rescheduled to be the optimum execution order at any timing, for example, every time a new command is stored in the command queue 231, every time the specified length of time elapses, or at the timing of being instructed by the host interface manager 221.

The command execution manager 222 manages the execution of the commands according to the order determined by the queue manager 223. As described above, in this embodiment, user data transfer between the host and the device can be internally controlled by the hard disk drive 120. As far as data transfer to or from the host 110 is concerned, the hard disk drive 120 can determine the optimum timing from the viewpoint of the reduction in latency in internal processing.

In view of an improvement in the processing efficiency, it is preferable not only to be able to determine, in no particular order, the order of data transfer corresponding to each command, but also to divide the data corresponding to one command and transfer each partial data in no particular order. In addition, it is more desirable that while several pieces of partial data corresponding to one command are transferred, partial data of another command can be transferred. For example, the NCQ optionally supports these transfer methods. In the case where "non-zero buffer offsets" is set at "Enable", that is, offsets to specify partial data can be set, and "guaranteed in-order delivery" is set at "Disable", that is, data can be transferred in no particular order, partial data can be transferred by the transfer method as described above. Incidentally, the embodiment will be below described on the assumption that this condition is satisfied.

Processing of a read command is to instruct transfer of read data, part or all of which does not exist in the cache 232. This processing requires not only data transfer processing that transfers data existing in the cache 232 to the host, but also medium access processing that temporarily reads out read data existing only in a magnetic disk into the cache 232. For this reason, in this embodiment, processing of one read command is classified into medium access processing and data transfer processing. Then the data transfer processing of the read command in question or that of another command is executed during the medium access processing. As a result, it becomes possible to improve the processing efficiency of commands.

Figure 4:
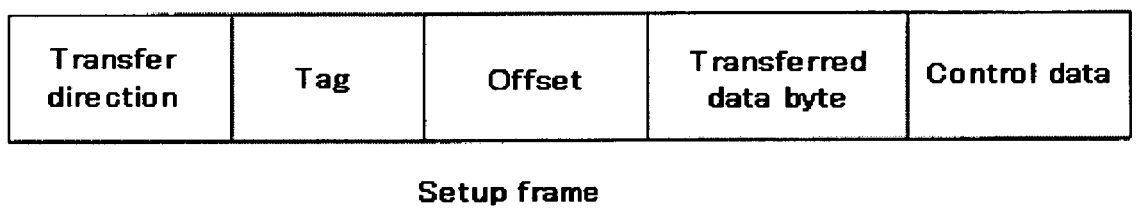
FIG. 4 is a diagram illustrating as an example a data format of a setup frame according to an embodiment of the present invention.

Moreover, since the hard disk drive 120 controls transfer of user data, it issues to the host 110 a setup frame used for the data transfer. FIG. 4 is a diagram illustrating a typical data format of a setup frame according to this embodiment. "DMA Setup FIS (Frame Information Structure)" of the NCQ is an example of a setup frame. The setup frame includes a field for specifying a transfer direction. More specifically, a "Transfer direction" field specifies a data transfer direction of read or of write. A "Tag field" identifies an unfinished command that is queued, and that requires data transfer. As described above, for example, 32 commands are respectively identified by tags that denote 0 through 31.

An "Offset" field specifies an offset of transfer data so as to allow transfer of partial data corresponding to one command. "Non-zero buffer offsets" of the NCQ is an example of the "Offset" field. A "Transferred data byte" field specifies the number of bytes of data to be transferred. In addition, in combination with the "Offset" field, the "Transferred data byte" field allows transfer of partial data corresponding to one command. In addition, the setup frame can include a "Control data" field, which contains information about a frame type, control data transfer, and the like.

On completion of user data transfer, a command completion notification is transmitted from the hard disk drive 120 to the host 110. The host interface manager 221 can control the transmission of this command completion notification. The timing of outputting a command completion notification corresponding to each command is not limited to immediately after the completion of the command. From the viewpoint of improvement in performance, the command completion notification can be output to the host 110 at proper timing.

Figure 5:
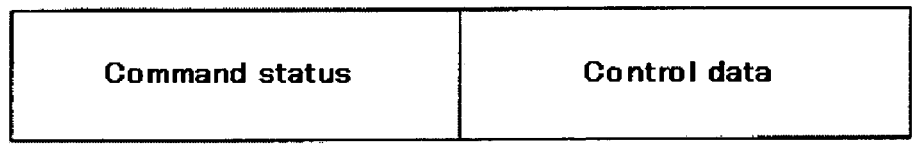
FIG. 5 is a diagram illustrating as an example a data format of a command completion notification according to an embodiment of the present invention.

FIG. 5 is a diagram illustrating as an example a data format of a command completion notification according to this embodiment. The command completion notification includes a "Command status" field, and a "Control data" field containing information about a frame type, and the like. The "Command status" field denotes a status of each command identified by each tag. It is desirable that the "Command status" field be formed of bits, the number of which is the same as the number of commands to be queued. To be more specific, if 32 commands can be queued, the "Command status" field becomes 32-bit data. Each bit can indicate a status of a command corresponding to each tag.

For example, if a specified bit is set, this bit can indicate that a command having a tag corresponding to this bit has been successfully completed. Moreover, as described above, if the host 110 needs to be notified of the completion of a plurality of commands, a plurality of bits in the "Command status" field are set. In contrast with this, if a bit is cleared, this bit can indicate that a command having a tag corresponding to this bit has not yet completed. In the NCQ, "Set Device Bits FIS" is an example of a command completion notification; and the "SActive" field is an example of the "Command status" field.

Figure 6:
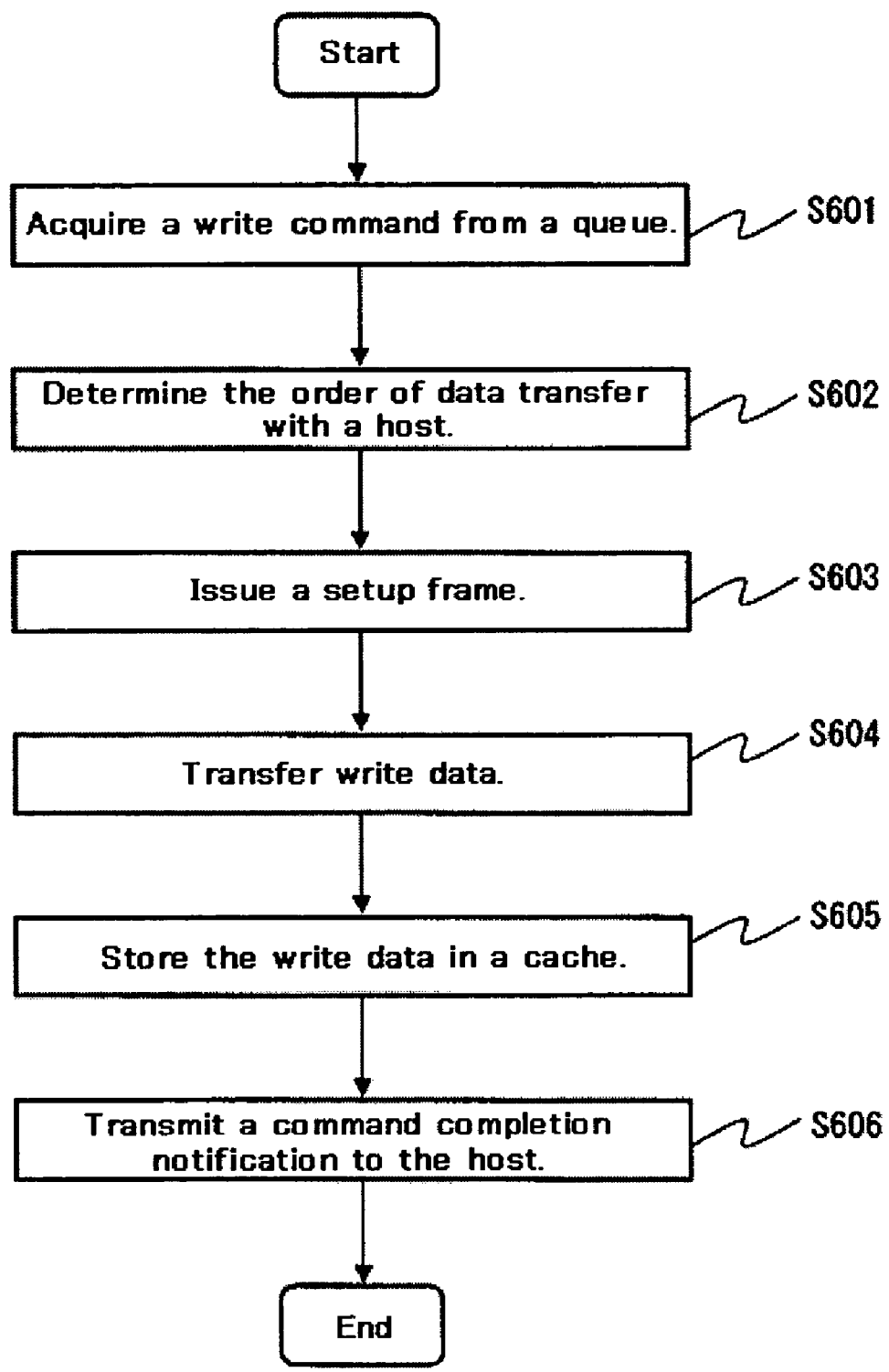
FIG. 6 is a flowchart illustrating a write command processing method used in a HDD according to an embodiment of the present invention.

Next, a command processing method according to this embodiment will be described. In the first place, basic operation of write command processing will be described. FIG. 6 is a flowchart illustrating a method for processing a write command. Upon acquiring a write command from the queue manager 223 (step S601), the command execution manager 222 requests the host interface manager 221 to start data transfer from the host 110. The host interface manager 221 determines the order of data transfer with the host 110 (data includes user data, and control data such as a command completion notification) according to given algorithm (step S602). In this example, in response to a request, the host interface 211 is requested to start transfer of write data. The host interface 211 issues a setup frame in response to the request (step S603).

The host 110 transfers write data in response to the setup frame (step S604). The transferred write data is sent from the host interface 211 through the memory manager 213, and is then stored in the cache 232 (step S605). After that, the host interface 211 transmits to the host 110 a command completion notification in which the bit of the "Command status" field is set (step S606).

Incidentally, if the cache 232 is in a "Disable" state, the host interface manager 221, which has been notified of the completion of data transfer, notifies the command execution manager 222 of the completion of data transfer. The command execution manager 222 then requests the drive manager 224 to write data. After that, under the management of the drive manager 224, the drive interface 212 outputs to the magnetic disk 121 write data that has been obtained from the memory 130 through the memory manager 213. As soon as writing of the write data to the magnetic disk 121 ends, the host interface 211 transmits a command completion notification to the host 110.

Figure 7:
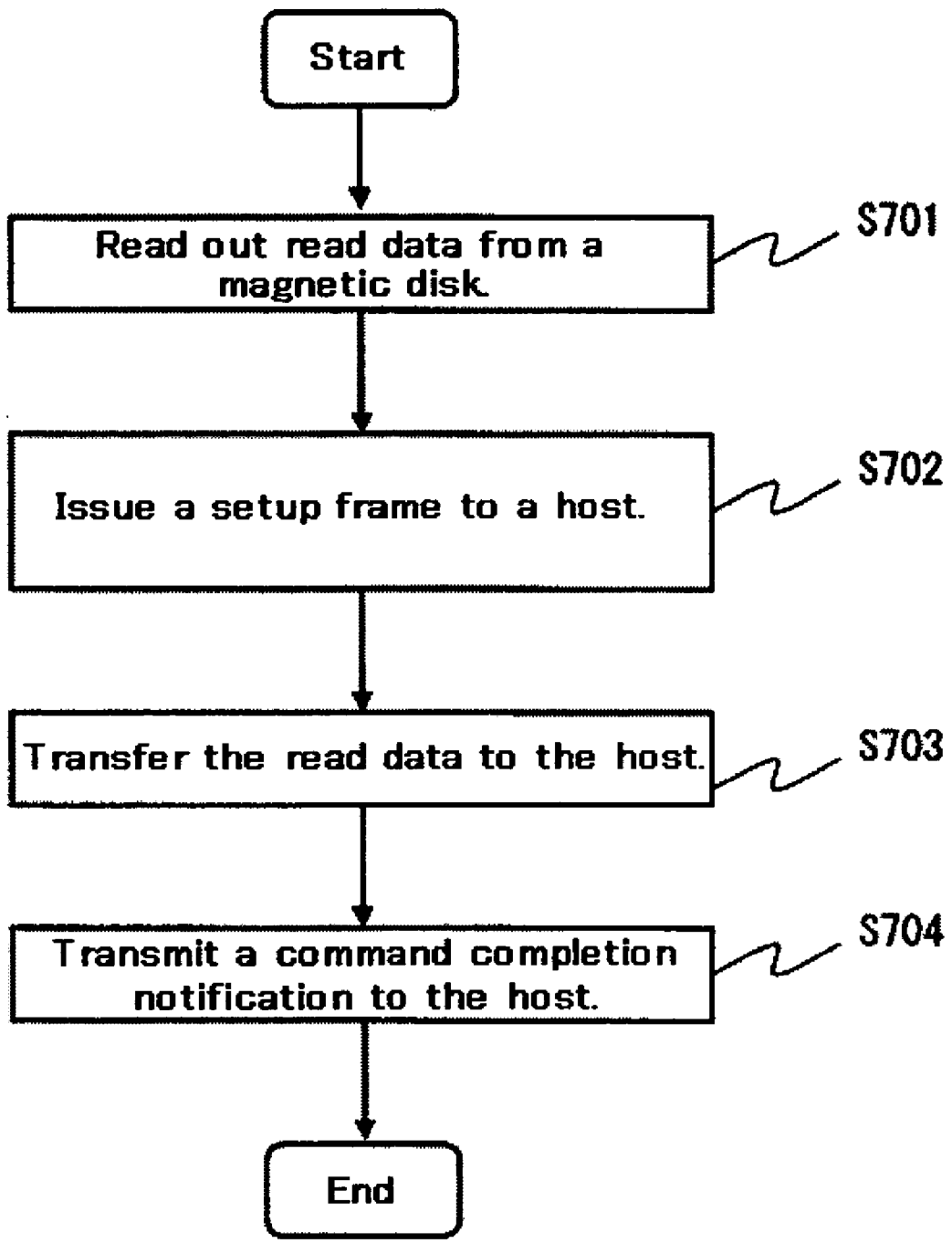
FIG. 7 is a flowchart illustrating a read command processing method used in a HDD according to an embodiment of the present invention.

Next, basic operation of read command processing will be described. FIG. 7 is a flowchart illustrating a method for processing a read command. How to execute a read command by the command execution manager 222 depends on whether or not the read command requires access to a magnetic disk. To be more specific, if the read command requires access to the magnetic disk, it is also possible to execute both access to the magnetic disk and data transfer in parallel.

Usually, if it is necessary to access a medium, that is, if a read command which requires access to a medium is executed because part or all of read data does not exist in the cache 232, the command execution manager 222 requests the drive manager 224 to read from the magnetic disk 121 read data specified by the read command. Under the control of the drive manager 224, the read data from the magnetic disk 121 is stored in the cache 232 of the memory 130 through the drive interface 212 and the memory manager 213 (step S701).

Moreover, the command execution manager 222 passes a transfer request of read data to the host interface manager 221. In response to the request from the command execution manager 222, the host interface manager 221 requests the host interface 211 to start data transfer to the host 110. The host interface 211 issues a setup frame in response to the request (step S702). The host interface 211 acquires, through the memory manager 213, read data stored in the cache 232. Then, the host interface 211 transfers the read data to the host 110 (step S703). On completion of the transfer processing, the host interface 211 notifies the host interface manager 221 that the transfer of the read data has been completed.

The host interface manager 221 requests the host interface 211 to transmit a command completion notification. After that, the host interface 211 transmits to the host 110 the command completion notification in which the bit of the "Command status" field is set (step S704).

If it is not necessary to access the magnetic disk, that is, if a read command which does not require access to a medium is executed because all of read data exists in the cache 232, a transfer request of the read data is passed to the host interface manager 221. Then, the host interface manager 221 requests the host interface 211 to start data transfer to the host 110. In response to the request, the host interface 211 executes the processing from the step S702 so that a setup frame is issued.

Incidentally, it is desirable that the timing of transmitting the command completion notification of the read command and that of the write command be determined from the viewpoint of the efficiency of internal processing in consideration of other commands, other command completion notifications, or the like.

Embodiments of the present invention will be described in more detail below. As described above, on receipt of the write command or the read command from the host, the HDD reads out user data (transfer data) from the disk and then transfers the user data to the host, or writes, to the disk, transfer data received from the host, according to the received command. At this time, if a write cache stays in an ON (able) state, the write command ends when the cache 232 receives the transfer data from the host. In this case, writing of data from the write cache to the magnetic disk can be executed at the timing that is determined by the HDD itself.

Thus, in the case of the write command, at the point of time when data transferred from the host is stored in the cache 232 of the HDD, the occupation of the bus between the HDD and the host ends. This point of time can be regarded as the completion of the write command. In other words, the write command can end without accessing the disk by the HDD.

In the meantime, transfer data to be transferred to the host is temporarily read out into the cache 232 before it is transferred to the host. At this time, if user data is read out up to an address that is ahead of an address at which the transfer data is actually read out, so that the user data is stored in the cache 232 in advance, it is possible to efficiently execute other read commands. Thus, what is called, read-ahead (look-ahead) can be performed if necessary.

Here, in the case of a read command, if the cache 232 does not include targeted transfer data, the HDD needs to access a disk to read the targeted data. To be more specific, if LBAs of data indicated by a command exist in the cache 232, the read command can be completed without access to the magnetic disk. On the other hand, if the LBAs do not exist in the cache 232, the read command cannot be completed until the access to the medium ends. In this case, even if some LBAs exist in the cache 232, it is necessary to access the magnetic disk before completing the read command in question unless all of the LBA exist in the cache 232.

To be more specific, when a write command or a read command is received, if all data exists in the cache 232, the command requires only data transfer processing. However, when a read command is received, if part or all of data does not exist in the cache 232, medium access processing is required. More specifically, it is necessary to access the magnetic disk, and to temporarily read out the data into the cache 232 before transferring the data. Because the access processing of accessing the magnetic disk involves mechanical internal operation, it takes long time to complete the processing. In addition, because data is not transferred during the medium access processing, the bus is brought into an unoccupied state.

For this reason, when a read command is received, if part or all of read data does not exist in the cache 232, data transfer processing of the read command in question or of other commands is executed during the period of time in which the magnetic disk is accessed to read out data (the medium access time). To be more specific, any one of the steps is executed: among pieces of read data corresponding to the read command in question, which is accessing the medium, transferring the read data existing in the cache 232 to the host; or among pieces of read data corresponding to other read commands, transferring the read data existing in the cache 232 to the host; or transferring write data from the host to the cache (write command). As a result, during the medium access time of the read command, data transfer with the host can be carried out in parallel, making it possible to shorten the processing time of the commands.

In this embodiment, the queue manager 223 classifies commands to be queued, and processing of the commands. The queue manager 223 in this embodiment classifies a read command into three kinds: a read command that handles data, all of which exists in the cache 232; a read command that handles data, only part of which exists in the cache 232; and a read command that handles data, all of which do not exist in the cache 232. Here, in this specification, when a read command is received, a case where all read data exist in the cache 232 is referred to as "all hit"; a case where only part of read data exists in the cache 232 is referred to as "half hit"; and a case where all read data do not exist in the cache 232 but exist only in a magnetic disk is referred to as "no hit".

In other words, the queue manager 223 classifies a write command, and a read command of all hit, as commands that do not require access to the magnetic disk (hereinafter also referred to as "access unnecessary command"), and classifies a read command of half hit, and that of no hit, as commands that do require access to the magnetic disk (hereinafter also referred to as "access necessary command").

As described above, the read command of half hit and that of no hit, which require access to the magnetic disk at the time of executing the commands, need processing of accessing the magnetic disk to read out data that does not exist in the cache 232 so as to execute these commands (step S701). This access to the medium is the mechanical internal operation described above, and does not use the bus that is a transmission line between the HDD and the host. On the other hand, the write command that does not require access to the medium, and the read command of all hit, occupy the bus during the execution of these commands. Thus, this embodiment achieves the efficient execution of commands by processing in parallel other commands occupying the bus during the medium access time of one command. For this reason, the queue manager 223 classifies processing of each command into the medium access processing that does not occupy the bus, and the data transfer processing that occupies the bus. It then determines the optimum execution order of the commands on the basis of what kind a command is, and whether or not access to a medium is required (whether or not the bus needs to be occupied).

To be more specific, when rescheduling the plurality of commands that are queued in the command queue 231, the queue manager 223 first identifies a command as a write command or a read command, and then identifies the read command as a read command of all hit, half hit, or no hit, and further classifies each command as a command that needs access the medium, or a command that need not access the medium. What is then searched for is a command that does not require access to the medium, and that can be executed during the medium access time of the command requiring access to the medium. After that, the scheduling is executed also in consideration of whether or not parallel processing is possible.

Here, the medium access time is made up of the seek time taken to access a target LBA by a head, the rotational latency, and the read time taken to read out target data. This medium access time can be calculated by the MPU 129 from a position of a current head or a cylinder, a head, a servo sector number, of the last point of the last executed command, and a top cylinder, a head, and a servo sector number, of a target command. The seek time can be calculated from the difference between the cylinders. The rotational latency can be calculated from the difference between the servo sector numbers. The transfer time (the read time) taken to transfer data from the disk to the cache 232 can be calculated from a transfer rate to the cache 232 and the amount of data to be read out. Incidentally, the transfer time from the disk to the cache 232 is a value that changes in response to a disk zone in which a LBA of read data to be read out exists.

Processing of the read command differs depending on whether the read command is a read command of all hit, no hit, or half hit. As described above, the case of the read command of all hit requires only the data transfer processing. Both the cases of the read command of no hit and that of half hit, however, require the medium access processing. Accordingly, during this period of time, it is possible to perform the data transfer processing that need not access the medium. Moreover, as for the read command of half hit, part of read data is stored only in the disk, and the rest is stored in the cache 232. While the medium access processing is carried out which reads out into the cache 132 part of read data stored only in the disk, therefore, data transfer processing may be executed which transfers to the host the above-mentioned remaining read data that is already stored in the cache 232. Alternatively, data transfer processing may be executed, for example, according to another command such as a write command, or the like.

Figure 8:
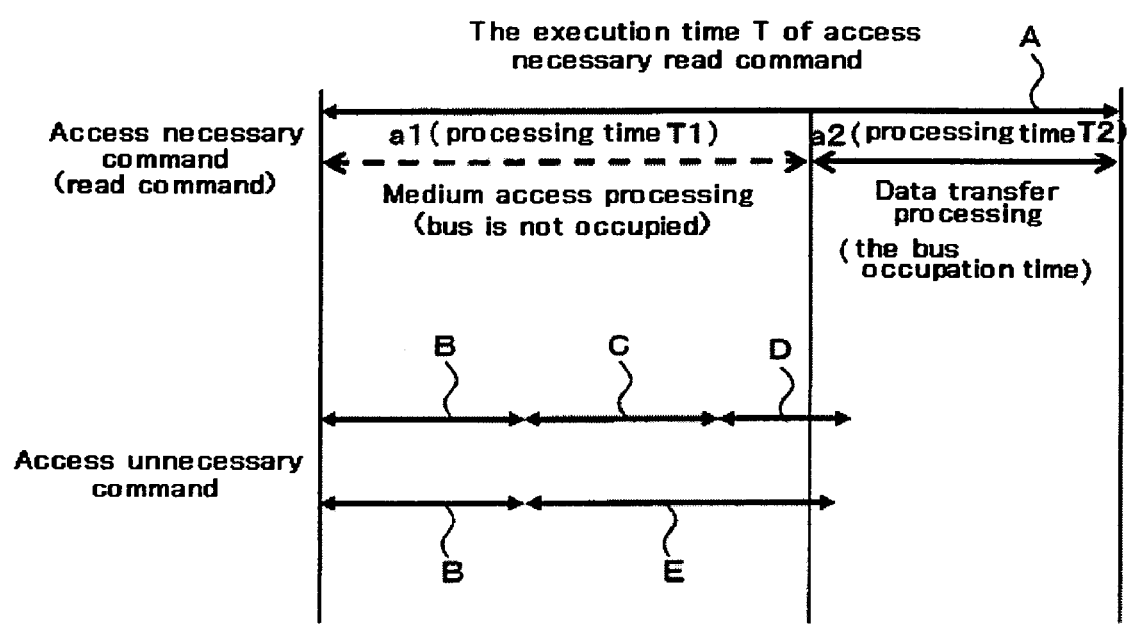
FIG. 8 is a flowchart illustrating parallel processing of read commands executed in a HDD according to an embodiment of the present invention.

An example of this rescheduling will be described. FIG. 8 is a schematic diagram illustrating a command to be executed in parallel. As shown in FIG. 8, with regard to an access necessary command A, assumptions are made as follows: the execution time of a read command of no hit is T; medium access processing which accesses a magnetic disk to read out data into the cache is a1 (processing time T1); data transfer processing which transfers data from the cache to the host is a2 (processing time T2); and the execution time T is T1+T2. Since the medium access processing a1 does not occupy the bus, an access unnecessary command (that is to say, a command that involves the occupation of the bus) can be executed. Thus, the access unnecessary command, which can be executed within the time T1 of this medium access processing, can be executed in parallel. In this case, an access unnecessary command can also be selected from the command queue 231. In addition, part of the command in question (i.e., the data transfer processing a2) can also be executed.

In either case, it is desirable to efficiently make use of the processing time T1 during which the bus is not occupied. In the example shown in FIG. 8, when access unnecessary commands are selected from the command queue 231, the processing time T1 is not long enough to complete both access unnecessary commands B, E. Only command B, therefore, is a command that can be completed. In this case, a command that can be completed within the remaining time may also be searched for again. For example, as shown in FIG. 8, even if the command E cannot be completed, a command C can be completed.

Moreover, any access unnecessary command may be selected so long as it can be completed within the processing time T1. However, for example, if a higher priority is placed on some commands that are queued in the command queue 231, the selection is made on the basis of the priority. As an example of the priority placed on commands, it can be configured that a read command has a higher priority than a write command. Because read data is data required by the host, it is necessary to transfer read data as early as possible. This is the reason why a higher priority is placed on the read command. Further, the priority can also be given on the basis of the order of queuing in the command queue 231 (in the order of commands that have been queued); or the above-mentioned methods for placing the priority may also be used in combination.

Incidentally, in the command queue 231, when a command is stored therein, a link based on the order in which commands are queued is generated. In addition, judging from a read flag, and a write flag, of a command ID, a kind of command can be easily identified.

Figure 9:
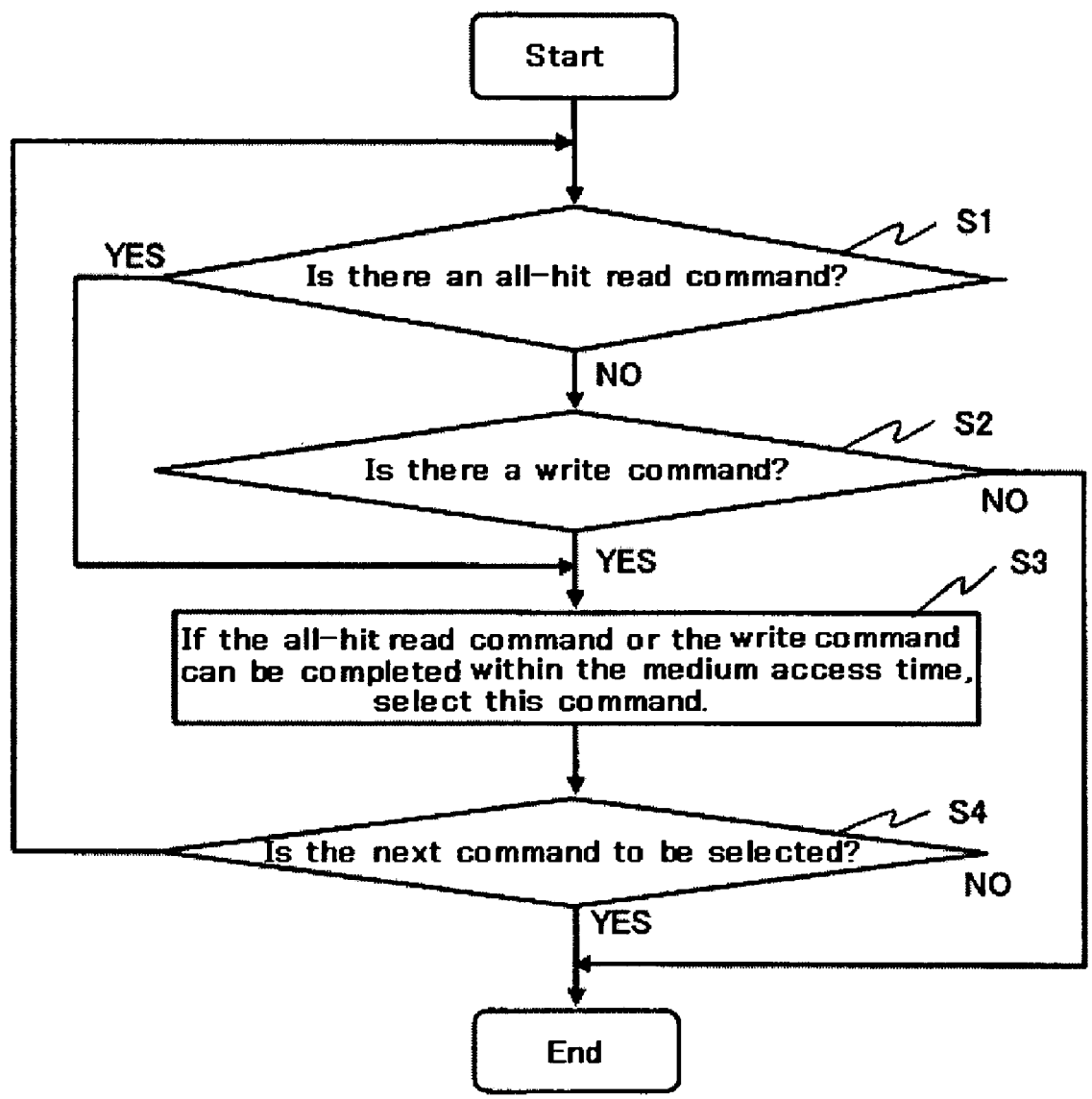
FIG. 9 is a flowchart illustrating as an example how to determine the order of commands including an access unnecessary command according to an embodiment of the present invention.

FIG. 9 is a flowchart illustrating as an example how to determine the order of commands including an access unnecessary command. When executing an access necessary command, the queue manager 223 can select a command to be executed in parallel. Here, the access necessary command will be described taking a read command of no hit as an example. To begin with, the queue manager 223 calculates the medium access time of the no-hit read command. Then, as shown in FIG. 9, the queue manager 223 searches the command queue 231 for commands. Here, it is to be noted that it is possible to search the command queue 231 in the order in which commands are queued in advance.

To begin with, the command queue 231 is searched for a read command belonging to an access unnecessary command, that is to say, a read command of all hit (step S1). If no all-hit read command is found, then the command queue 231 is searched for a write command (step S2). If an all-hit read command is found (step S1: YES), or if a write command is found, a judgment is made as to whether or not the command can be completed within the medium access time. In other words, a judgment is made as to whether or not the processing time of the command is shorter than the medium access time. If it is judged that the processing time of the command is shorter than the medium access time, the command is selected as a command to be executed in parallel (step S3). Then, a judgment is made as to whether or not to select the next command (step S4). As for this judgment, for example, it can be configured that if the remaining medium access time is shorter than the specified time, the next command is not selected. If so, the processing ends. In addition, if the processing time of the selected all-hit read command, or that of the selected write command, is longer than the processing time T1, it is judged that the command selected in the step S1 or the step S2 cannot be executed in parallel. Also in this case, a judgment is made as to whether or not to select the next command (step S4). If it is judged that the next command should be selected, the processing from the step S1 is repeated.

Figure 10:
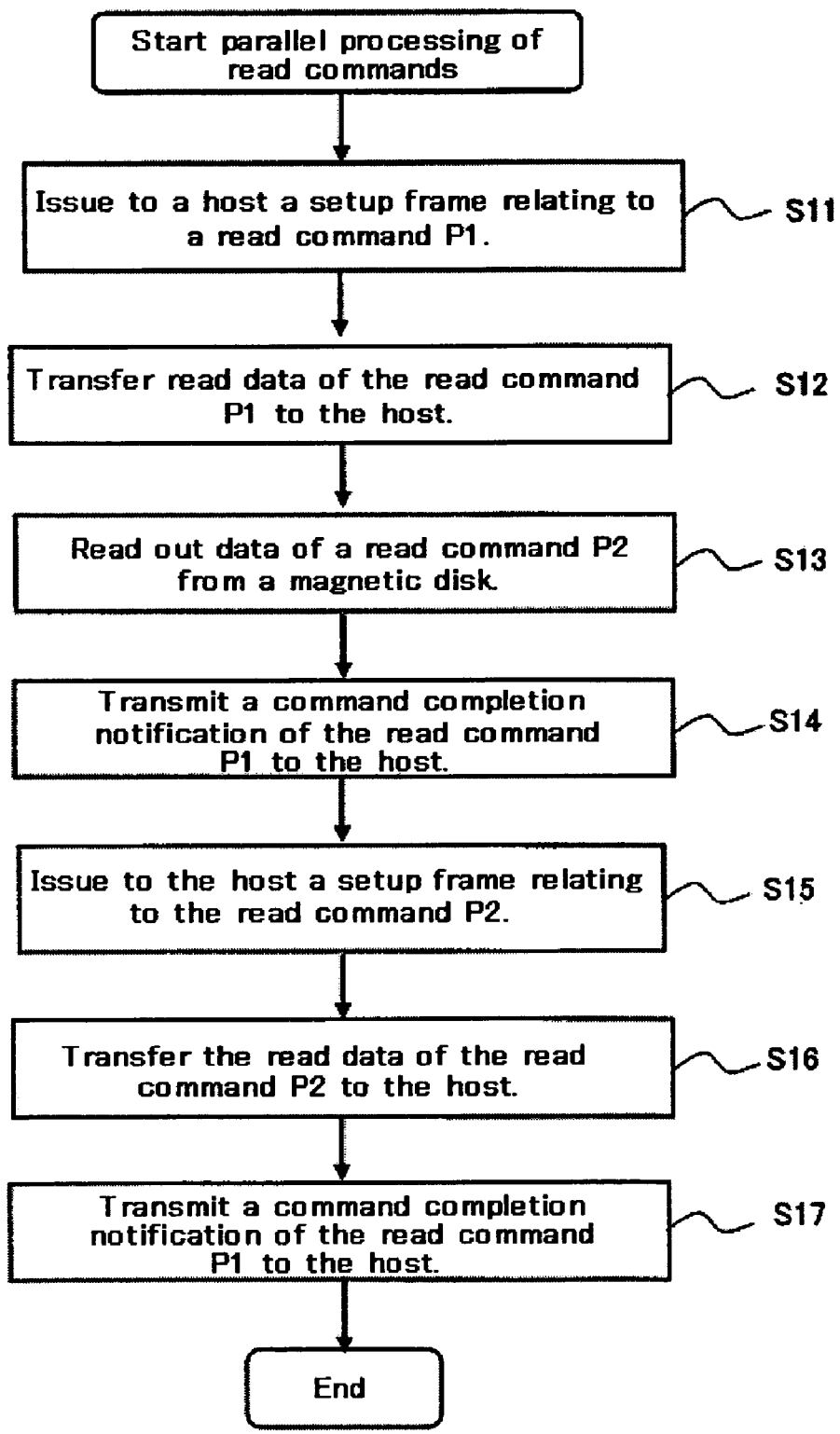
FIG. 10 is a flowchart illustrating a processing method for processing a read command, in which two commands are processed in parallel, according to an embodiment of the present invention.

FIG. 10 is a flowchart illustrating a processing method for processing a read command, in which two commands are processed in parallel with each other. A description will be made of a case where while executing a read command that is a command requiring access to a magnetic disk (more specifically, a no-hit read command or a half-hit read command), the command execution manager 222 selects another command to be executed in parallel by the above-mentioned method. In addition, a description will be made by way of example of a case where while a no-hit read command P2 that requires access to the magnetic disk is processed, an all-hit read command P1 which does not require access to the magnetic disk is executed in parallel.

In this case, the command execution manager 222 passes to the host interface manager 221 a transfer request to transfer read data specified by the all-hit read command P1. In response to the request from the command execution manager 222, the host interface manager 221 requests the host interface 211 to start data transfer to the host 110. The host interface 211 issues a setup frame in response to the request (step S11). The host interface 211 acquires, through the memory manager 213, read data stored in the cache 232. Then, the host interface 211 transfers the read data to the host 110 (step S12).

During this time, the command execution manager 222 requests the drive manager 224 to read out data corresponding to the no-hit read command, from the magnetic disk 121. Under the control of the drive manager 224, the data read out from the magnetic disk 121 is stored in the cache 232 of the memory 130 through the drive interface 212 and the memory manager 213 (step S13). Here, as shown in FIG. 9, the read command P1 is selected as a command that can be completed within the processing time (the medium access time) of the read command P2 which reads out read data from the magnetic disk into the cache 232. Accordingly, data transfer by the read command P1 ends within the processing time during which the read data is read out from the magnetic disk.

Then, as soon as the transfer processing by the all-hit read command P1 is completed, the host interface 211 notifies the host interface manager 221 that the transfer of the read data has been completed. The host interface manager 221 requests the host interface 211 to transmit a command completion notification. After that, the host interface 211 transmits to the host 110 the command completion notification in which the bit of the "Command status" field is set (step S14).

After that, the command execution manager 222 passes to the host interface manager 221 a transfer request of the read command P2 that has changed from the no-hit read command to the all-hit read command as a result of the processing of the step S13. In response to the request from the command execution manager 222, the host interface manager 221 requests the host interface 211 to start data transfer to the host 110. The host interface 211 issues a setup frame in response to the request (step S15). The host interface 211 acquires, through the memory manager 213, read data stored in the cache 232. Then, the host interface 211 transfers the read data to the host 110 (step S16). The host interface 211 notifies the host interface manager 221 that the transfer of the read data has been completed. The host interface manager 221 requests the host interface 211 to transmit a command completion notification. After that, the host interface 211 transmits to the host 110 the command completion notification in which the bit of the "Command status" field is set (step S17).

It is to be noted that the read command requiring access to the magnetic disk may also be a half-hit read command, and that the command not requiring access to the magnetic disk may also be a write command. In addition, when executing a half-hit read command, other all-hit read commands or write commands may also be executed in parallel. In this case, as described in FIG. 8, the processing of the half-hit read command may be divided into the following two pieces of processing: processing that requires access to the medium, more specifically, processing of accessing the magnetic disk to read out data which is not read out into the cache 232; and processing that does not require access to the medium, more specifically, processing of transferring, to the host, data which is read out into the cache 232. Then, during the processing time of the processing that requires access to the medium, the processing not requiring access to the medium may be executed. Moreover, it may also be configured that between the two kinds of processing of the half-hit read command, only the processing which can be executed without access to the medium is executed in parallel during the medium access time of other commands. Further, processing from the step S15 is data transfer processing. Accordingly, this data transfer processing may also be executed in parallel with medium access processing of other access necessary read commands.

Incidentally, as described above, when read data is read out from the disk, the read command can also read ahead (look-ahead) data at the same time. The read ahead of data is processing that reads out not only data of a target LBA but also data of subsequent LBAs when the read command is executed. The read ahead makes it possible to store, in the cache 232, read-ahead data that has been read out. Usually, because read commands often perform sequential access, the read ahead improves a hit ratio of all hit, making it possible to shorten the processing time of the commands. In addition, if there arises many all-hit cases, the number of commands which can be selected in the above step S1 increases, making it possible to make use of the medium access time with higher efficiency.

The length of read ahead is appropriately set according to, for example, when there is a command to be executed next, the capacity of the cache 232, or the like. To be more specific, if there is a command to be executed next, the execution of the command precedes the read ahead, and accordingly the read ahead is canceled. When the cache 232 has the little amount of free space, the length of read ahead is set at a short value.

Here, if there are many all-hit read commands, the number of commands which can be selected during the medium access processing increases. It is therefore possible to expect the more efficient execution of processing. For this reason, in the present invention, the length of read ahead is determined so as to improve a ratio of all-hit read commands. How to set the length of the read ahead is described below. A comparison is made between addresses of read data to be read out from the disk. This read data corresponds to a half-hit read command, or a no-hit read command, which is a queued read command. If the relationship between the end of data pointed to by one address and the top of data pointed to by the other address satisfies specified conditions, the other address is included in the read-ahead range of the read command that reads out data pointed to by the one address.

More specifically, to begin with, a comparison is made between a LBA of the top of data to be read out by a queued read command and a LBA of the end of the same data. Then, a LBA of the end of data to be read out by one read command is compared with a LBA of the top of data to be read out by the other read command. If successive reading from the data corresponding to the one read command up to the data corresponding to the other read command is faster than accessing the magnetic disk again, the data to be read out by the other read command is included in the range of read ahead by the one read command. As a result, the medium access processing of the one read command can change the another read command to an all-hit read command.

The processing time of an all-hit read command, or that of a write command, is nearly the same as the length of time taken to transfer data (the bus occupation time). This processing time is extremely short, and is easy to do reordering. In addition, when a read command is received, if it is a half-hit or no-hit read command, this read command requires access to the medium. However, the range of choices for commands is expanded which perform data transfer processing that is executed in parallel during this medium access processing. As a result, the efficiency of command processing is improved.

Figure 11:
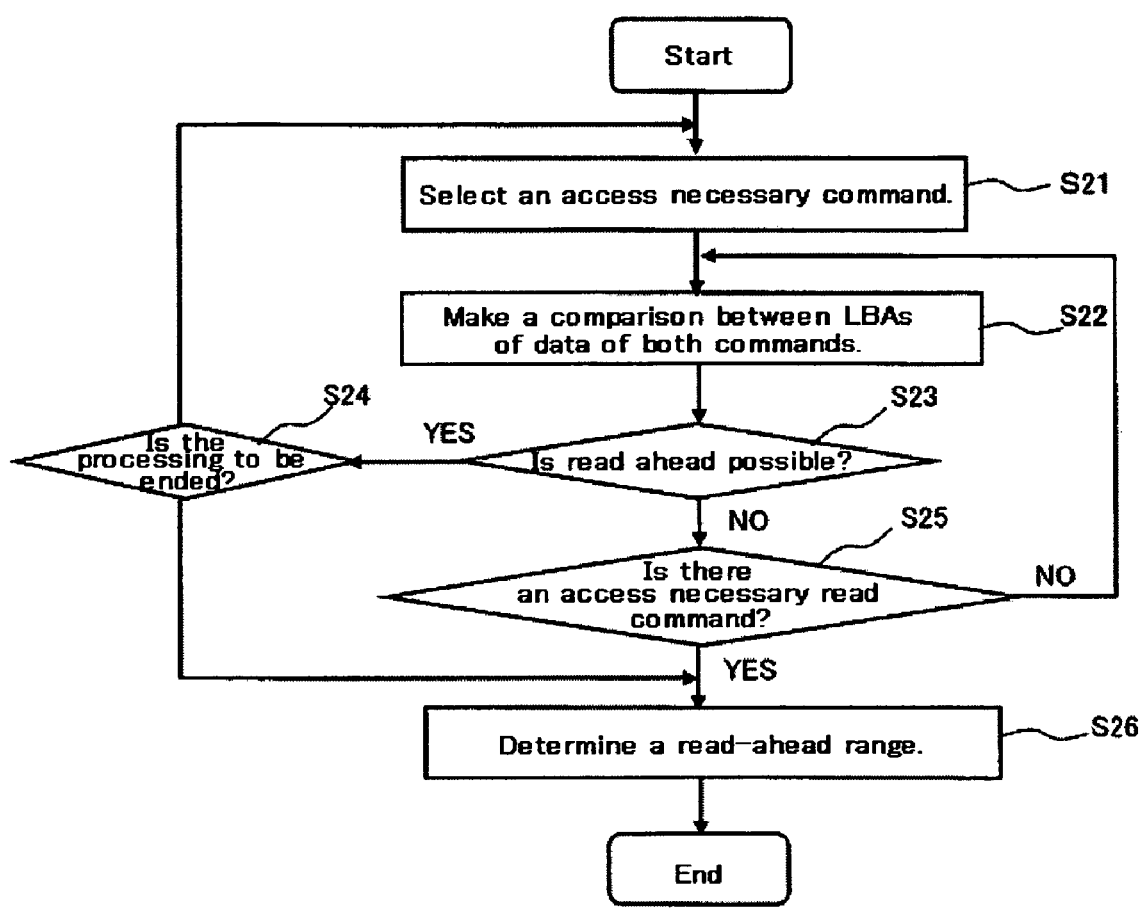
FIG. 11 is a flowchart illustrating as an example a method for determining a read-ahead range according to an embodiment of the present invention.
Figure 1:
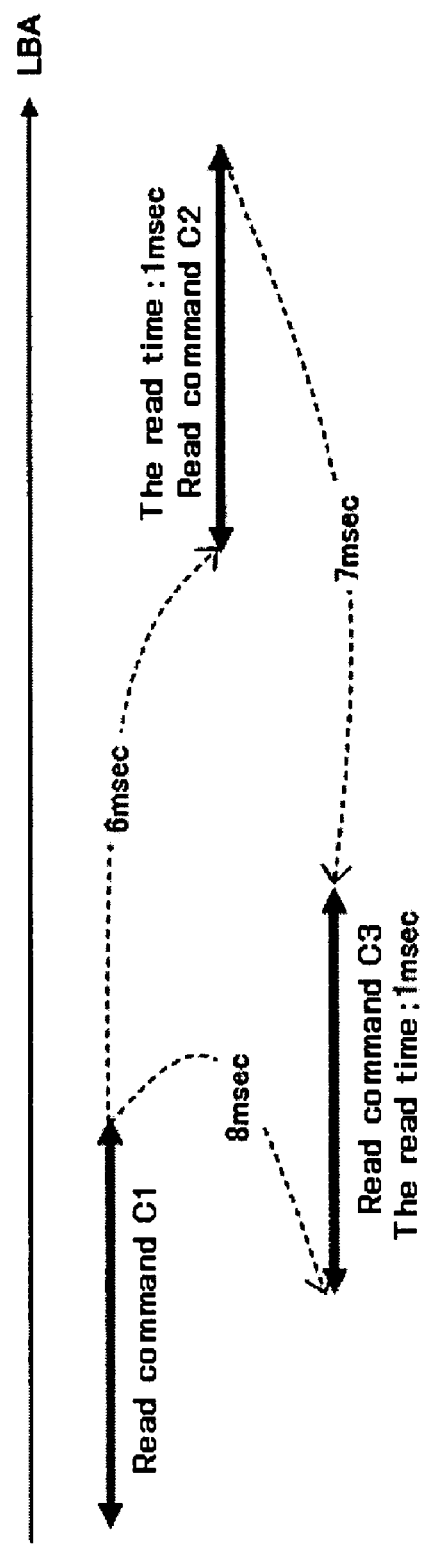

FIG. 11 is a flowchart illustrating as an example a method for determining a read ahead range. A description will be made of a method in which the queue manager 223 determines a read-ahead range of an access necessary command (hereinafter referred to as "command $\alpha$") stored in the command queue 231. In the first place, when the command $\alpha$ is stored in the command queue 231, the queue manager 223 selects an access necessary command (hereinafter referred to as "command $\beta$") from among a plurality of commands stored in the command queue 231 (step S21). It is to be noted that both the command $\alpha$ and the command $\beta$ are assumed to be no-hit read commands here.

Next, a comparison is made between LBAs of data of both commands. On the assumptions that LBAs of data of the no-hit read command $\alpha$ are $\alpha LBA\_S$ through $\alpha LBA\_E$, and that LBAs of data of the no-hit read command $\beta$ are $\beta LBA\_S$ through $\beta LBA\_E$, comparisons are made between the top and the end of them. To be more specific, $\alpha LBA\_E$ is compared with $\beta LBA\_S$, and $\beta LBA\_E$ is compared with $\alpha LBA\_S$. Then, from the result of the comparisons, a judgment is made as to whether or not read ahead is possible (step S23). To be more specific, if the processing time taken to read the command $\beta$ in succession after reading of the command $\alpha$, or the processing time taken to read the command $\alpha$ in succession after reading of the command $\beta$, is shorter than the total length of time taken to individually read the command $\alpha$ and the command $\beta$ to execute them, it is judged that read ahead is possible. If read ahead is not possible, the command queue 231 is searched for another access necessary command (step S25). If another access necessary command $\gamma$ is found, the processing from the step S22 is repeated. If read ahead is possible, a judgment is made as to whether or not to end the processing (step S24). If it is judged that the processing is to be continued, the step 21 is repeated in which an access necessary command is selected again, and a judgment is made as to whether or not read ahead is possible.

Incidentally, the judgment made in the step S24 as to whether or not to end the processing is done in the following manner. That is, it can be judged that the processing is to be ended, for example, if the total length of the processing time is equivalent to the specified time or more, or if the amount of processing data to be read is equivalent to a specified value or more. If the processing is to be ended, or if no access necessary read command is found, the processing ends, and then a read ahead address that has been determined is updated (step S26).

Here, for example, when a new command is queued in the command queue 231, if the new command is an access necessary command, it is desirable that a judgment be made in this manner as to whether or not each access necessary command which is already stored in the command queue 231 is to be included in a read-ahead range.

Next, a specific example of this embodiment will be described. FIG. 12 is a diagram illustrating an effect of improving processing of read commands by means of read ahead. As shown in FIG. 12, there are read commands C1, C2, C3. Here, the read command C1 is a no-hit read command; the read command C2 is also a no-hit read command; and addresses of read data of the read command C1 partially overlap those of the read command C3 (in other words, the read command C3 has half-hit relationship with the read command C1). In addition, the access time (the seek time+rotational latency) from an end address of the read command C1 to the read command C2 is 6 msec; the access time (the seek time+rotational latency) from the end address of the read command C1 to the read command C3 is 8 msec; the access time (the seek time+rotational latency) from an end address of the read command C2 to the read command C3 is 7 msec; and the read time taken to read out from the magnetic disk after access is 1 msec for both the read commands C2, C3.

On the assumption that the read command C1 is first executed, these three read commands C1 through C3 are executed. Here, as is the case with the conventional method, if the processing order is determined only in consideration of the access time, the processing order becomes the read command C1→the read command C2=the read command C3. In this case, the length of time taken to access the read commands C2, C3 from the end of the read command C1 so as to read out data from the magnetic disk is the sum of: the access time taken to access from the end address of the read command C1 to the read command C2, which is 6 msec; the length of time taken to read out data of the read command C2, which is 1 msec; the access time taken to access from the end address of the read command C2 to the read command C3, which is 7 msec; and the length of time taken to read out data of the read command C3, which is 1 msec. In short, the sum is 6+1+7+1=15 msec. It is to be noted that the above-mentioned processing time is the length of time required for medium access processing that reads out, from the magnetic disk, read data of the read commands C1 through C3 into the cache 232.

In the meantime, as described above, when the read-ahead range is determined in consideration of the medium access time, addresses of read data of the read command C3 partially overlap those of the read command C1. The data of the read command C3, therefore, can be successively read after reading of the data of the read command C1. To be more specific, by including the read data of the read command C3 in the read-ahead range of the read command C1, it is possible to treat the read command C3 as an all-hit read command. Thus, if the processing order of three read commands is determined so as to cause these read commands to become all-hit read commands wherever practicable, the processing order is given as follows: the read command C1→the read command C3 (equivalent to reading ahead of the read command C1)→the read command C2. In this case, the length of time taken to access the read commands C3, C2 from the end of the read command C1 so as to read out data from the magnetic disk is the sum of: the length of time taken to read out the read command C3 as the read-ahead range of the read command C1, which is 1 msec; the access time taken to access from the end address of the read command C3 to the read command C2, which is 7 msec; and the length of time taken to read out data of the read command C2, which is 1 msec. In short, the medium access processing time for this case is 1+7+1=9 msec.

As described above, by determining the read-ahead range in consideration of addresses of read data of the read commands, it is possible to reduce useless access operation, and thereby to shorten the processing time of the commands.

In this embodiment, when a command is put in the command queue 231, the queue manager 223 classifies the command and the processing thereof, and then determines a read-ahead range. Here, a read command, all of read data of which are included in the cache 232, is designated as an all-hit read command; a read command, part of read data of which is included in the cache 232, is designated as a half-hit read command; and a read command, no read data of which is included in the cache 232, is designated as a no-hit read command. In the case of the half-hit read command or the no-hit read command, the medium access time required to access the magnetic disk to read out read data is calculated. Then, processing of the read command is divided into processing of accessing the magnetic disk and data transfer processing with the object of executing the data transfer processing during the medium access time. As a result, the access to the medium and the data transfer can be executed in parallel with each other during the execution of one read command, making it possible to shorten the processing time.

To be more specific, there are used the functions of: determining the start timing of data transfer on the HDD side; and concurrently performing data transfer required by a plurality of commands. Accordingly, processing is not classified on a command basis, but processing is classified according to whether or not it is necessary to access the medium, or according to whether or not it is necessary to occupy a bus. Then, during the medium access processing, the data transfer processing which needs to occupy the bus is executed in parallel. Thus, it is possible to improve the performance of command processing by dividing processing of one command into a plurality of pieces of processing if necessary so as to execute the plurality of pieces of processing in parallel with each other.

In addition, with the object of further shortening the processing time as a command, and with the object of improving the efficiency of command processing by increasing the number of commands requiring data transfer processing to be executed during the medium access time, a read-ahead range at the time of accessing the medium is determined. To be more specific, on the basis of each address of read data that requires access to the medium, a read-ahead range of one read data is configured to include read data of another read command on the condition that the processing time taken to successively read out the read data is shorter than the processing time taken to individually read out the read data. As a result, the other read command that needs to read out the read data in question can be regarded as an all-hit read command.

As a result of totally rescheduling the queued commands in this manner, if there is another command to be executed in parallel with an access necessary read command, these commands are treated as a set; and the medium access processing, and the data transfer processing, of the access necessary read command are executed in parallel to shorten the processing time. Consequently, it is possible to achieve efficient command processing.

Thus, in this embodiment, the medium access and the data transfer are executed in parallel with each other, and a read-ahead range is set to increase the number of all-hit read commands. Accordingly, even if the number of commands to be stored in a command queue is small, or even if the number of command queues is small, it is possible to shorten the seek time and the rotational latency as much as possible, and to make the most of a period of time made up of the seek time and the rotational latency, which enables an improvement in performance of command processing. Moreover, in this embodiment, the read-ahead range is determined only by making a comparison between LBAs, so that rescheduling is performed. Accordingly, even if there is no function of monitoring a head position, for example, by use of RPS (rotational position sensing) information, it is possible to improve the processing efficiency extremely easily.

Incidentally, the present invention is not limited to the embodiments described above, and as a matter of course, the present invention can be changed in various ways within the range that does not deviate from points of the present invention. For example, the relationship between each processing and the logical configuration is not limited to the above-mentioned example. A designer can design a storage device by use of effective functions and effective circuit configurations. In this embodiment, although the magnetic head 122 is a read/write head capable of performing both write processing and read processing, the present invention can also be applied to a read dedicated device that performs only read processing. It is to be noted that although the present invention is in particular useful for magnetic disk storage devices, the present invention can also be applied to storage devices in other modes, such as optical disk storage devices, which drive a medium as a storage medium.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A media drive that transfers write data or read data between the media drive and a host according to a command, said media drive comprising:
   a queue capable of storing a plurality of commands; and
   a command manager configured to classify the plurality of commands on the basis of whether or not execution of each command requires access to a medium, and then optimize execution order of the commands;
   wherein said command manager optimizes the execution order so that medium access processing of accessing the medium for execution, and data transfer processing of transferring data between the media drive and the host, are executed in parallel with each other.

2. A media drive according to claim 1, wherein:
   said command manager classifies processing of said command into medium access processing that performs said medium access processing, and data transfer processing that performs said data transfer processing, and then optimizes the execution order on the basis of the result of the classification.

3. A media drive according to claim 2, further comprising:
   a temporary storage unit configured to store write data transferred from the host, and read data to be transferred to the host;
   wherein among pieces of processing of the read command, said command manager classifies a pieces of processing of reading out, into the temporary storage unit, part or all of read data stored only in the medium as the medium access processing, and classifies each of another piece of processing of transferring read data stored in the temporary storage unit to the host and another pieces of processing of storing write data from the host in the temporary storage unit, as the data transfer processing.

4. A media drive according to claim 3, wherein:
   if part of the read data is stored only in the medium and a remaining part of the read data is stored in the temporary storage unit, said command manager executes in parallel the medium access processing of reading out the part of the read data stored only in the medium into the temporary storage unit, and the data transfer processing of transferring to the host the remaining part of the read data stored in the temporary storage unit, or processing of the access unnecessary read command or processing of a write command.

5. A media drive according to claim 1, further comprising:
   a temporary storage unit configured to store write data transferred from the host, and read data to be transferred to the host;
   wherein said command manager classifies read commands into an access unnecessary read command, all of read data of which is stored in the temporary storage unit, and an access necessary read command, part or all of the read data of which is stored only in the medium, and thereby optimizes the execution order on the basis of the result of the classification.

6. A media drive according to claim 5, wherein:
   if part of the read data is stored only in the medium and a remaining part of the read data is stored in the temporary storage unit, said command manager executes in parallel the medium access processing of reading out the part of the read data stored only in the medium into the temporary storage unit, and the data transfer processing of transferring to the host the remaining part of the read data in question stored in the temporary storage unit.

7. A media drive according to claim 5, wherein:
   said command manager executes in parallel the medium access processing of reading out the read data, part or all of which is stored only in the medium, into the temporary storage unit, and the data transfer processing of other read commands or of a write command.

8. A media drive according to claim 5, wherein:
   said command manager further comprises a read-ahead range determination part for determining a range of read-ahead data of a read command on the basis of the result of the classification; and
   said read-ahead range determination part determines the read-ahead range so that data of one of the access necessary read commands, which is stored only in the medium, is included in the read-ahead data of another of the access necessary read commands.

9. A media drive according to claim 8, wherein:
   said read-ahead range determination part compares addresses of read data to be read out from the medium for each of the access necessary read commands, and if the relationship between one end of one address and one end of another address satisfies specified conditions, said read-ahead range determination part sets the read-ahead range of said one address so that said another address is included.

10. A media drive according to claim 8, wherein:

said read-ahead range determination part compares a sum total of a length of time required to individually read out each read data of the plurality of access necessary read commands, which is stored only in the medium, with the sum total of a length of time required to read out the same read data in succession, and then determines a read-ahead range on the basis of the result of the comparison.

11. A media drive according to claim 8, wherein:

said command manager reclassify an access necessary read command, read data of which is included in the read-ahead range determined by the read-ahead range determination part, as an access unnecessary read command.

12. A media drive according to claim 1, wherein:

said command manager determines the execution order on the basis of execution priority of the commands, or execution priority of processing of the commands.

13. A media drive according to claim 12, wherein:

said command manager places a higher execution priority on the read command than on the write command.

14. A media drive according to claim 12, wherein:

said command manager places a higher execution priority on a command that has been stored in the queue earlier.

15. A media drive according to claim 12, wherein:

said command manager places a higher execution priority on the access unnecessary read command than on the access necessary read command.

16. A media drive according to claim 12, wherein:

said command manager places a higher execution priority on the data transfer processing than on the medium access processing.

17. A media drive that transfers write data or read data between the media drive and a host according to a command, said media drive comprising:

a queue capable of storing a plurality of commands;

a command manager configured to classify the plurality of commands on the basis of whether or not execution of each command requires access to a medium, and then optimize execution order of the commands; and a read-ahead range determination part configured to determine a read-ahead range of a read command on the basis of the result of the classification;

wherein said read-ahead range determination part determines a read-ahead range of a read command requiring access to a medium so that the read-ahead range causes another read command requiring access to the medium not to require access to the medium.

18. A command processing method of a media drive capable of storing a plurality of commands in a queue to execute the commands, said method comprising:

classifying the plurality of commands on the basis of whether or not execution of each command requires access to a medium; and on the basis of the result of the classification, optimizing execution order of the plurality of commands so that medium access processing of accessing the medium for execution, and data transfer processing of transferring data between the media drive and a host, are executed in parallel.

19. A command processing method for a media drive capable of storing a plurality of commands in a queue to execute the commands, said method comprising:

determining a read-ahead range of a read command requiring access to a medium, among the plurality of commands, so that the read-ahead range causes another read command requiring access to the medium not to require access to the medium; and optimizing execution order of the plurality of commands on the basis of whether or not execution of each command requires access to the medium.

* * * * *